United States Patent [19]

Vander Horst

[11] 4,278,396
[45] Jul. 14, 1981

[54] HUB SEALS FOR THRUST-ASSISTED CENTRIFUGAL PUMP

[76] Inventor: John Vander Horst, 28153 War Admiral Trail, Evergreen, Colo. 80439

[21] Appl. No.: 905,798

[22] Filed: May 15, 1978

[51] Int. Cl.³ .................................................. F04D 29/22
[52] U.S. Cl. .................................... 415/63; 415/80; 415/83; 415/113
[58] Field of Search .................... 415/80, 83, 109, 111, 415/113, 115, 62, 63, 66, 68, 170 A, 173, 174, 132, 133, 121 A, 168, 116, 176, 81, 82

[56] References Cited

U.S. PATENT DOCUMENTS

| | | | |
|---|---|---|---|
| 981,175 | 1/1911 | Corthesy | 415/116 |
| 2,049,343 | 7/1936 | Warren | 415/113 |
| 2,402,995 | 7/1946 | Garraway | 415/174 |
| 2,764,944 | 10/1956 | Lawrence | 415/204 |
| 2,816,509 | 5/1953 | Rice | 415/113 |
| 3,081,095 | 3/1963 | Hamrick | 415/176 |
| 3,104,803 | 9/1963 | Flatt | 416/92 |
| 3,171,357 | 3/1965 | Egger | 415/170 A |
| 3,228,342 | 1/1966 | Page | 415/113 |
| 3,540,833 | 11/1970 | Talamonti | 415/173 R |
| 3,748,057 | 7/1973 | Eskeli | 415/116 |
| 3,914,072 | 10/1975 | Rowley et al. | 415/111 |
| 3,930,744 | 1/1976 | Theis | 415/63 |

FOREIGN PATENT DOCUMENTS 2436458  2/1975  Fed. Rep. of Germany ...... 415/219 A

*Primary Examiner*—Everette A. Powell, Jr.
*Attorney, Agent, or Firm*—Edwin L. Spangler, Jr.

[57] ABSTRACT

This invention relates to a centrifugal pump characterized by a pair of novel self-aligning impeller hub seals located in the high pressure cavity and subjected to the influence thereof to maintain them in fluid-tight sealed contact with the adjacent cavity walls to which they are loosely fastened. The invention also encompasses a novel thrust-type hub seal subassembly that is continually biased into fluid-tight sealed contact with an annular abutment on the impeller hub, the latter element being the only surface in relatively movable frictional engagement with the seal with such engagement being face-to-face so that the thrust compensates for any wear therebetween. Another feature of the invention is the cooperative relationship between the self-aligning impeller hub seals, the thrust-type hub seal and pressure relief passages in the impeller hub whereby the thrust seal is isolated from the relatively higher fluid pressure in the high pressure cavity. Finally, one version of the pump has a jet-assisted impeller wherein radial passages therein discharge the working fluid into an annulus which, in turn, discharges into the high pressure cavity through tangentially-directed jets, the thrust of which reduces the torque that would, otherwise, have to be supplied by the pump motor.

6 Claims, 4 Drawing Figures

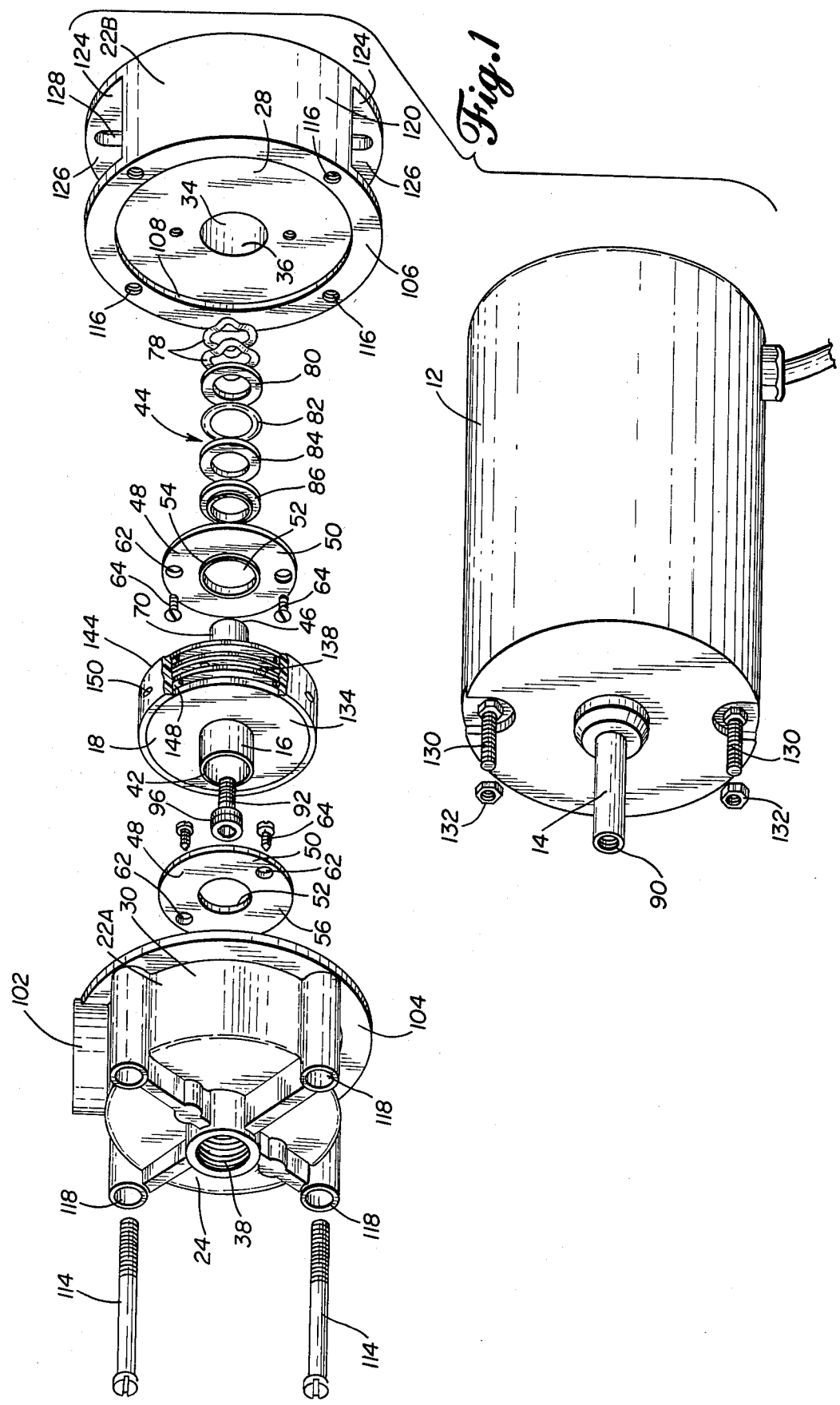

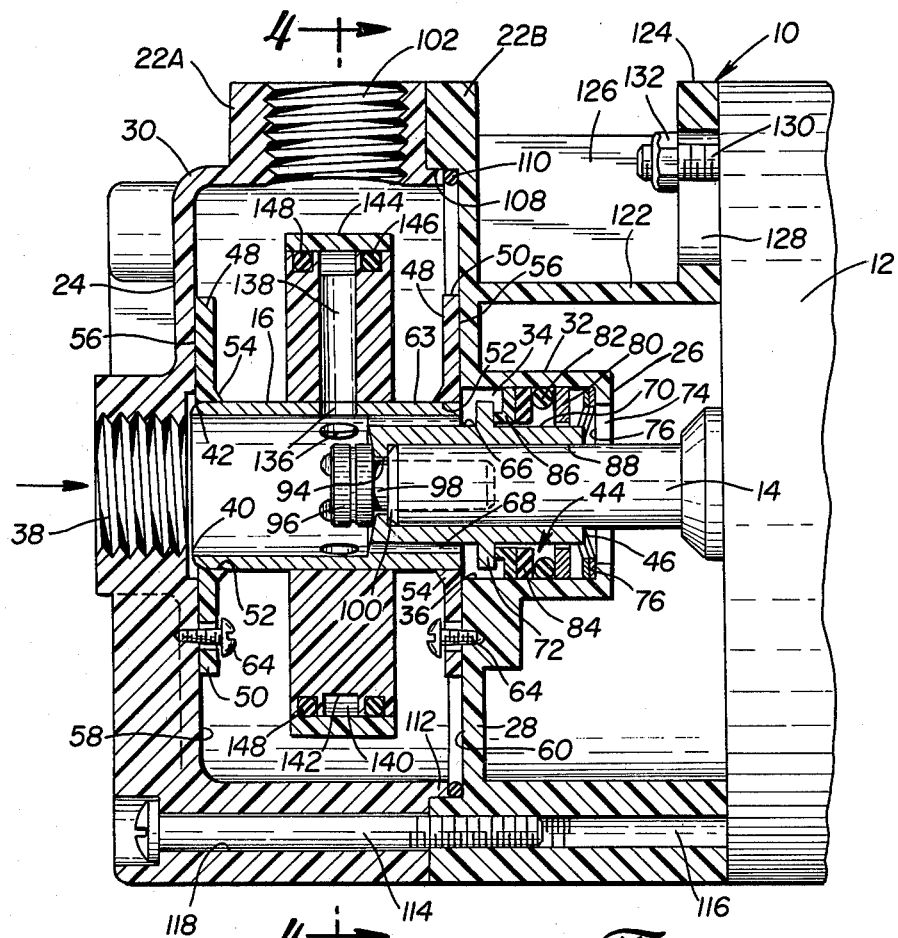
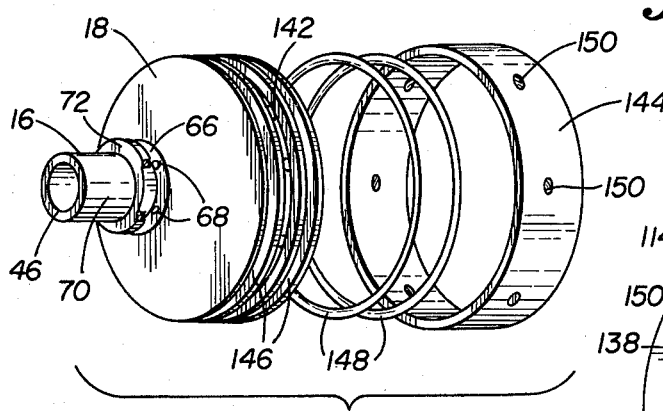
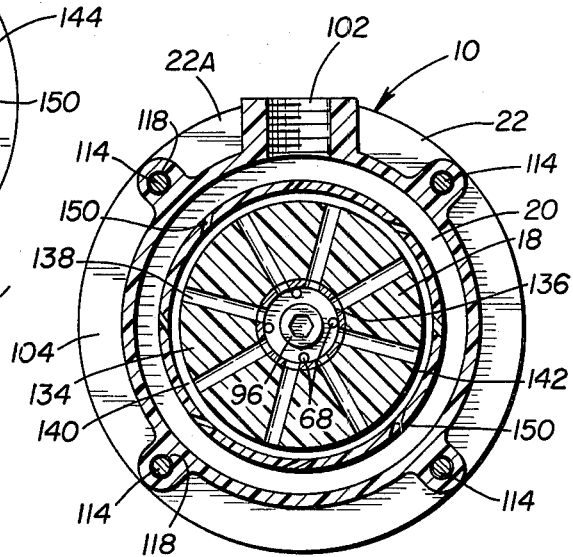

HUB SEALS FOR THRUST-ASSISTED CENTRIFUGAL PUMP

A common feature of all centrifugal pumps is some kind of an impeller which receives the working fluid at one pressure and exhausts it at a relatively higher pressure into a cavity in which the impeller rotates. A necessary adjunct to such a pump is one or more essentially fluid-tight seals on the impeller hub or shaft that effectively prevent the working fluid from leaking out of the high pressure cavity.

There are many different types of these shaft seals, those used in high pressure pumps being especially hard to design due to the pressure differential across them. As a matter of fact, most all such seals do leak to some degree despite efforts to eliminate leakage. While the differential pressure is almost always a factor in fluid leakage, it is by no means the only one. For instance, one of the most common problems is that of producing and maintaining proper alignment. Misalignment between the motor shaft and the impeller hub results, for example, when the pump housing and motor housing do not mate properly, yet, these elements are difficult to fabricate to close tolerances. Whatever the reason, and there are many, misalignment is an ever present problem in pump design that must be reckoned with and solved to an extent which will permit the unit to operate without failing prematurely. Such solutions can be both costly and time-consuming in terms of correcting a misaligned condition, especially if these efforts must be repeated over and over again on every pump.

It has now been found in accordance with the teaching found herein that many of these alignment problems can be inexpensively and effectively eliminated while, at the same time, providing an entirely adequately fluid-tight seal by means of the simple, yet unobvious, expedient of loosely mounting the impeller hub seals upon the interior walls of the high pressure cavity and employing the fluid therein to maintain essentially fluid-tight sealed contact therebetween. The resulting seal is self-aligning in that it can accommodate a fair amount of sidewise shift of the impeller hub axis, skewing thereof, or both. The resulting seal need only have the hub-receiving opening therein sized and shaped to engage the shaft with a close-sliding fit. Conversely, little or no attention need be given its axial alignment or location relative to the axis of impeller hub rotation.

Another problem with many centrifugal pump designs has to do with yet another type of hub seal, namely, the seal that prevents the working fluid from escaping the pump housing at the point where the motor shaft enters the latter. Here again, the prior art is replete with dozens of seals which are more or less effective in keeping a fluid inside a housing from escaping therefrom along a rotating shaft entering the latter. Nevertheless, the instant invention provides what is deemed to be a better and more efficient solution to this sealing problem in the form of a thrust seal that cooperates with the self-aligning hub seals previously alluded to and some pressure relief passages in the impeller hub to isolate the thrust seal from all but much lower fluid pressures than those that exist in the high pressure cavity. Even the thrust seal itself has some unusual features, one being an O-ring compressed both radially and axially into external continuous annular fluid-tight sealed contact with the cylindrical cavity in which it is seated while, at the same time, remaining completely unsupported internally. Equally, if not more significant, is the arrangement by which the only relatively movable surfaces of the seal and annular abutment in frictional engagement with one another lie in face-to-face relation such that the axial bias compensates for any wear therebetween.

Last, but by no means least, is the improved design of the impeller itself which, for certain applications, is ideal in that a smaller motor can be used due to a "jet-assist" action. The radial passages in the impeller open into an annular passage which, in turn, exhausts the working fluid into the high pressure cavity through one or more tangentially-directed jets. As the fluid is jetted from the relatively higher pressure state within the annular passage in the impeller to some lower pressure inside the high pressure cavity, the differential pressure and inclination of the jets is effective in accordance with Newton's Third Law of physics to impart additional rotational energy to the impeller that need not be supplied by the motor driving same.

Accordingly, it is the principal object of the present invention to provide a novel and improved centrifugal pump.

A second objective is the provision of a device of the character described which includes a novel thrust-type seal which engages the hub and forms a continuous annular fluid-tight seal therewith such that the axial bias developed by the seal compensates for any wear between the only surfaces moving relative to one another.

Another object is to provide a self-aligning seal between the impeller hub and the high pressure cavity within which it rotates that effectively diminishes the usual adverse consequences of misalignment while, at the same time, using the fluid pressure within said cavity to maintain the seal in fluid-tight sealed engagement with the interior surfaces thereof.

Still another object is the provision of a hub seal subassembly including a multi-element thrust seal, one of the pair of self-aligning impeller hub seals and pressure relief passages in the impeller shaft all of which cooperate with one another to effectively seal the entry of the motor shaft into the pump housing and, in so doing, positively isolate said thrust seal from the action of the high pressure present in the high pressure cavity.

An additional object is to provide a centrifugal pump of the type herein disclosed and claimed that includes a specially designed impeller operative to jet-assist the drive therefor and, moreover, increase such assistance as the flow becomes greater.

Further objects are to provide a centrifugal pump which is quite small in comparison with similar pumps of equivalent rated pressure and capacity, one that is easily and inexpensively repaired by replacing a few simple parts, a unit of the type described that is versatile and efficient, and one that can be depended upon for trouble-free continuous performance under varying conditions for a long period of time.

Other objects will be in part apparent and in part pointed out specifically hereinafter in connection with the description of the drawings that follows, and in which:

FIG. 1 is an exploded perspective view of the pump with portions of the impeller rim broken away to expose the interior construction;

FIG. 2 is a fragmentary view to a greatly enlarged scale showing the pump partly in elevation and partly in diametrical section;

FIG. 3 is an exploded perspective view of the impeller subassembly by itself as seen from the opposite side thereof from that revealed in FIG. 1, the scale being slightly larger than that of FIG. 1; and, FIG. 4 is a section taken along line 4—4 of FIG. 2 but to a reduced scale closely approximating that of FIG. 3.

Referring next to the drawings for a detailed description of the present invention, the pump forming the subject matter hereof has been broadly designated by reference numeral 10 and will be seen to include a conventional electric motor 12 having a drive shaft 14 operatively coupled to the hub 16 of impeller subassembly 18 so as to rotate the latter at high speed within the high pressure chamber 20 contained within housing 22. For purposes of the present description, housing 22 will be considered as having spaced end walls 24 and 26 with a partition wall 28 therebetween which cooperate with one another and with a pair of circumferential walls 30 and 32 to define a large compartment 20 and a smaller compartment 34 arranged in end-to-end relation, the smaller compartment having an inner cylindrical surface 36. End wall 24 of the large compartment contains a more or less centrally-located fluid intake opening 38 which, in the particular form shown, is internally threaded for connection to a supply of fluid (not shown) to be pumped. The term "fluid" as used herein is intended to encompass both liquid and gaseous mediums. The portion of end wall 24 bordering said intake opening 38 is, in the particular form shown, recessed to define an inwardly-opening cup-shaped cavity 40 adapted to receive, but not contact, the slightly rounded open end 42 of hub 16. A thrust seal subassembly indicated broadly by numeral 44 at the other end 46 of the hub biases the open end 42 thereof toward said cup-shaped cavity; however, the connection soon to be described between the motor shaft 14 and the hub prevents axial movement of the latter into a position where it seats in the bottom of this cavity.

The high pressure impeller hub seals 48 both lie within compartment 20 and are most clearly revealed in FIGS. 1 and 2 to which detailed reference will next be made. These seals are identical and both of them comprise discs 50 formed of a deformable material like "Teflon." Each such disc is provided with a central hub-receiving opening 52 preferably, but not necessarily, bordered by an annular cuff 54 projecting from one face thereof. The face 56 opposite that containing cuff 54 is essentially planar and adapted to mate with the flat surfaces 58 and 60 on the inside of end wall 24 and partition wall 28, respectively, to form a fluid-tight seal therewith when pressed thereagainst by the fluid pressure in compartment 20. The hub-receiving openings 52 in the seals 48 are sized to closely engage the outer cylindrical surface 63 of the hub while permitting the latter to rotate freely therein. The deformable cuffs 54 function to both increase the area of sealed contact between the seal and hub and, in addition, accommodate a limited degree of misalignment of the latter. In other words, cuff 54 will deform to the extent necessary to maintain an essentially fluid-tight seal around the latter even though the axes thereof lie in somewhat skewed as opposed to coaxial relation. More significant, however, is the self-aligning feature of seals 48 resulting from their being fastened to their respective compartment walls for limited movement in the plane of their mating flat faces. This capability of shifting to accommodate misalignment of the hub within housing 22 is simply accomplished by providing the discs 50 with oversize fastener-receiving openings 62 in comparison to the size of the shank of headed screw fasteners 64 as most clearly revealed in FIG. 2. Thus, seals 48 are free to "float" to a limited degree inside compartment 20 thereby compensating for one of the major problems faced by the designers of pumps of this type, namely, misalignment caused by such commonplace things as ill-fitting, bent or mismatched parts. Also, once these seals begin to leak to any appreciable extent due to wear or other factors, they can be quickly and easily replaced thereby more or less completely renewing the pump. From a manufacturing standpoint, the seals are extremely simple, about the only close tolerances being those of the roundness and size of openings 52.

The pump of the instant invention is capable of producing fluid pressures of 60 psi within impeller housing compartment 20 and, in time, some leakage past seals 48 is bound to take place. The fluid leaking past the seal around the intake opening 38 in the end wall 24 will, of course, re-enter the open end 42 of the impeller hub and be recycled. Provision is also made for returning any fluid that leaks past seal 48 on the partition wall 26 back to the open end 42 of the hub to be recycled. This same system exposes thrust seal subassembly 44 to only the inlet fluid pressure or some other pressure lower than that which exists in cavity 20 while, at the same time, preventing it from being subjected to the relatively higher pressure within high pressure compartment 20 brought about by fluid leaking past the partition wall seal. This combination fluid bypass and pressure relief system comprises an external annular groove 66 in the cylindrical surface 63 of the hub located between seal 48 and thrust seal subassembly 44 and one or more axial passages 68 connecting said groove with the open end 42 of the impeller hub. Fluid entering the intake opening 38 and passing into the open end 42 of the hub will be conducted through axial passages 68 and annular groove 66 into compartment 34 where the thrust seal subassembly 44 is located thus subjecting the latter to only inlet fluid pressure or at least some pressure less than that which exists in high pressure cavity 20. Such fluid as leaks past partition wall seal 48, also enters groove 66 and is conducted back out into the open end of the hub through passages 68 where it is recycled into compartment 20 by the impeller. Thus, seal 48 on the partition wall and the aforementioned annular groove and axial passages cooperate to maintain the thrust seal subassembly isolated at all times from the high fluid pressure present in compartment 20.

Continuing with reference to FIGS. 1 and 2, and particularly in connection with the latter, it can be seen that were it not for the presence of thrust seal subassembly 44, any fluid leaking from compartment 20 into compartment 34 would escape from the housing. The end 46 of the hub opposite the open end 42 thereof is necked down to provide a section 70 of reduced diameter separated from cylindrical section 63 by a first annular abutment-forming shoulder 72. The remaining portion of end wall 26 bordering the oversize shaft-receiving opening 74 therein defines a second annular abutment-forming shoulder 76 facing the first in axially-spaced relation. Axially compressed between these opposed abutments 72 and 76 is the thrust seal subassembly 44 which comprises a wavy compression spring ring 78 (two have been shown in FIG. 1) abutting shoulder 76, a rigid washer 80 next to spring 78, an O-ring 82 preferably compressed radially to lie in continuous annular fluid-tight sealed engagement with the interior surface of circumferential housing wall 32, a compressible elastic washer 84 and a second rigid washer 86 normally biased into continuous face-to-face annular fluid-tight sealed engagement against shoulder 72. Squeezing the O-ring between the washers on opposite sides thereof expands it circumferentially into external annular fluid-tight sealed contact with surface 36; however, it is preferred to use a slightly oversized O-ring that is subjected to some degree of radial compression even before it is squeezed axially. The annular seal established between shoulder 72 and washer 86 prevents the escape of fluid along the reduced section 70 of hub 16 while O-ring 82 performs a similar sealing function in preventing the escape of fluid along the inside of circumferential housing wall 32. It is important to note that no element of the thrust seal subassembly is supported internally. In fact, all internal surfaces thereof lie in spaced relation outside the reduced section 70 of the hub so that they remain out of frictional contact therewith at all times. The only surfaces in frictional contact are the annular abutment 72 and washer 86 which engage one another in face-to-face relation such that any wear therebetween is immediately compensated for and taken up by the axially-directed biasing force of springs 78.

An axial shaft-receiving socket 88 is provided in the end 46 of the hub sized to telescope over the drive shaft 14 as shown and maintain a coaxial relationship therebetween. Shaft 14 contains an internally-threaded axial socket 90 (FIG. 1) into which hub-mounting bolt 92 screws. An inturned annular rib 94 separates socket 88 from the open end 42 of the end of the hub. The head 96 of the bolt and the end of the motor shaft cooperate to define opposed annular abutments 98 and 100 (FIG. 2) that grip inturned annular rib 94 therebetween and form a driving coupling between said motor shaft and the impeller 18. It is this coupling between the impeller hub and motor shaft that prevents relative axial movement therebetween under the urging of thrust seal assembly 44.

As illustrated, housing 22 is fabricated in two sections, the first 22A being generally cup-shaped and containing both the fluid-inlet opening 38 and the fluid-outlet opening 102 in circumferential wall 30 thereof. The open end of section 22A is rimmed by an annular flange 104 that fits flush with a like flange 106 bordering the partition wall 28 of the second housing section 22B. Flange 106 is offset forwardly of the aforementioned partition wall to provide a cylindrical seat 108 for the reception of O-ring seal 110. A circular rib 112 (FIG. 2) projecting from the face of flange 104 telescopes into seat 108 and presses against the O-ring to produce a continuous annular fluid-tight seal between the mating sections 22A and 22B of the housing. The housing sections are held in assembled relation by bolts 114 that screw into internally-threaded openings 116 in section 22B from coaxial openings 118 in section 22A.

Housing section 22B also has opposite segments of its partition wall 28 rimmed by arcuate hubs 120 (FIG. 1), the adjacent ends of which are joined together by recessed wall sections 122 and a connecting web 124 paralleling partition wall 28 in spaced relation to the latter, the above-described elements cooperating to define a pair of oppositely-opening pockets 126. Connecting webs 124 are radially slotted as shown at 128 to receive the housing mounting bolts 130 projecting from the end of the motor 12 within which the drive shaft 14 is journalled. Access to nuts 132 and the mounting bolts 130 is gained within these pockets 126.

Finally, reference will, once again, be made to all four figures of the drawing for a detailed description of the novel features of the impeller 18. Mounted upon hub 16 for rotation therewith in coaxial relation is a circular disc 134 defining the impeller wheel. The open end 42 of the hub extends all the way into where the aforesaid wheel is mounted and aligned radially-extending fluid passages 136 and 138 in the hub wall and wheel, respectively, accept fluid entering the open hub end through intake opening 38 and deliver same onto the periphery of said wheel at a relatively higher fluid pressure due to centrifugal action.

An impeller constructed in the manner just described is quite common in centrifugal pumps and, up to this point, no novelty is claimed therefor. There are, however, certain pump applications where it is important to miniaturize the unit especially with reference to the size of the motor 12 driving the impeller. It has now been found in accordance with the teaching found herein that the torque necessary to drive the impeller so as to deliver a certain output need not all be supplied by the motor, but instead, can be provided in part by the fluid discharged by the impeller. To accomplish the foregoing, the fluid is not discharged directly from radial passages 138 into high pressure compartment 20 of the pump housing as is usually done, but rather into a continuous annular passage 140 circling the outside of the impeller wheel. This passage 140, in the particular form shown, is defined by an outwardly-opening groove 142 in the outer circumferential edge of the wheel aligned with radial passages 138 and covered by cylindrical rim 144 that encircles said wheel. A fluid-tight seal is maintained by providing annular O-ring grooves 146 on both sides of central groove 142, placing O-ring seals 148 in both of said O-ring grooves, and to use rim 144 as the means for maintaining the O-rings compressed within their respective grooves.

The key feature is the series of tangentially-directed ports 150 in the rim 144 positioned to receive fluid under pressure from annular passage 140 and deliver same with a jet action essentially tangentially as opposed to radially into compartment 20. As long as the outlet pressure in the pump housing, i.e. the pressure in compartment 20, is lower than the pressure in impeller wheel annulus 140, the jets of fluid will leave the impeller and assist in the rotation thereof thus reducing the torque required to be furnished by the impeller drive. Of course, regardless of the pressure of the fluid entering the impeller along its axis of rotation, it will be accelerated as it is flung out through radial passages 138 thereby increasing its pressure in the manner common to all rotating centrifugal pumps. In the instant pump, the fluid pressure in annulus 140 remains at a constant level regardless of the changes in pressure within compartment 20.

What is claimed is:

1. In a centrifugal pump: an impeller having a hub open at one end to receive fluid to be pumped from a supply thereof, a wheel-like body mounted on said hub in encircling relation thereto; and connecting fluid passages within said hub and body adapted upon rotation of the latter to receive fluid from the open end of the hub at one pressure and discharge same at the periphery of the body due to centrifugal action at a relatively higher pressure; a housing having a pair of spaced end walls and a partition wall therebetween cooperating with one another and with first and second circumferential wall members bridging the gaps between the latter to define a pair of chambers arranged in end-to-end relation, the first of said chambers being larger than the second and sized to receive the impeller for rotation therein, the second of said chambers being generally cylindrical in shape and positioned to receive the end of the impeller hub opposite the open end thereof for rotational movement therein in substantially coaxial relation, the partition wall having an oversize opening therein positioned to loosely pass the end of said impeller hub opposite its open end from the first chamber into the second, the end wall of said second chamber having a central opening therein positioned and adapted to receive the drive shaft of a motor for driving the impeller upon being operatively coupled to the hub thereof so as to prevent relative axial movement therebetween, the end wall of said first chamber having a fluid-intake opening therein registering with the open end of the impeller hub for delivering fluid to the latter, a first annular abutment carried by that portion of the impeller hub within the second cavity; a second abutment depending from a wall of the second cavity arranged in axially-spaced opposed relation to said first abutment; and a thrust seal subassembly positioned within said second cavity between said first and second spaced abutments, said assembly including an O-ring within said second cavity encircling the impeller hub in circumferentially spaced relation, a first rigid ring abutting the O-ring between the latter and the second abutment, a second rigid ring between the O-ring and first annular abutment, and compression spring means between the first ring and second abutment biasing said second ring into essentially fluid-tight annular face-to-face engagement with said first annular abutment, and said spring also cooperating with said annular abutments and rings to squeeze the O-ring axially so as to expand the latter circumferentially into continuous annular fluid-tight sealed contact with the inner cylindrical surface of said second cavity while leaving unconfined that portion of said O-ring remote from the seal thus formed.

2. The centrifugal pump as set forth in claim 1 wherein the outside diameter of the O-ring is slightly greater than the inside diameter of the inner cylindrical surface of the second cavity such that the former is radially compressed within the latter.

3. The centrifugal pump as set forth in claim 1 in which the thrust seal subassembly includes a compressible ring interposed between the O-ring and second rigid ring.

4. The centrifugal pump as set forth in claim 1 in which: seal means carried by the partition wall bridges the gap between the opening in the latter and the surface of the impeller hub passing therethrough, said seal being effective to isolate the thrust seal subassembly from the elevated fluid pressure existent in the first chamber, and in which pressure relief passages are provided in the impeller hub effective to return any fluid from the first chamber that leaks past the seal means carried by the partition wall back to the open end of said hub to be recycled.

5. The centrifugal pump as set forth in claim 4 in which said pressure relief passages comprise an external annular groove on that portion of the hub lying between the annular abutment carried thereby and the portion thereof engaged by the seal means depending from the partition wall, and at least one passage interconnecting the open end of said hub with said annular groove.

6. The subcombination for use in a motor-driven centrifugal pump of an impeller comprising: a cylindrical hub open at one end to receive a fluid to be pumped and having the end opposite said open end connectable to the drive shaft of a motor for rotating same; and a wheel-like body having a rim encircling same in the form of a ring, said body being fastened in coaxial relation to said hub for rotation therewith, said body including a series of three annular grooves opening onto the inside of said ring in side-by-side relation, the middle groove of the three cooperating with said ring to define an annular fluid passage, a pair of O-ring seals seated within the two remaining grooves cooperating therewith and with said ring to define continuous fluid-tight seals on both sides of said fluid passage, at least one radial passage connected to receive fluid from the open end the hub and deliver same to the annular passage for circulatory movement around the ring, and at least one exhaust port in said ring inclined in a direction opposite the direction of rotation, said parts being connected to receive fluid from the annular passage and discharge same from the ring in the form of a jet effective to develop a thrust assisting in the rotation thereof.

* * * * *